(12) United States Patent
Kotick et al.

(10) Patent No.: US 6,987,480 B1
(45) Date of Patent: Jan. 17, 2006

(54) VOICE COMMUNICATIONS CONTROL SYSTEM AND METHOD

(75) Inventors: David M. Kotick, Orlando, FL (US); Sam T. Giambarberee, Orlando, FL (US); John H. Allen, Winter Park, FL (US); Jeffrey D. Meister, Titusville, FL (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/450,640

(22) Filed: Nov. 24, 1999

(51) Int. Cl.
*G01S 13/39* (2006.01)

(52) U.S. Cl. ...................................... 342/41

(58) Field of Classification Search ............... 345/716, 345/727, 728, 734, 740; 718/10, 80, 109, 718/110, 370
See application file for complete search history.

(56) References Cited

U.S. PATENT DOCUMENTS

| | | | | |
|---|---|---|---|---|
| 4,959,015 A | * | 9/1990 | Rasinski et al. | 434/2 |
| 5,838,384 A | * | 11/1998 | Schindler et al. | 348/563 |
| 6,031,529 A | * | 2/2000 | Migos et al. | 345/783 |
| 6,249,241 B1 | * | 6/2001 | Jordan et al. | 144/36 |
| 6,317,039 B1 | * | 11/2001 | Thomason | 340/505 |

* cited by examiner

*Primary Examiner*—Ricky Ngo
*Assistant Examiner*—Duc Duong
(74) *Attorney, Agent, or Firm*—Eliot Abolafia; John G. Mills

(57) ABSTRACT

An audio communications control system operates between multiple voice communications systems and a single headset worn by an operator accessing the multiple communications systems via voice transmission. The single headset includes a left speaker, a right speaker, and a microphone. The audio interface provides an electrical connection and operation with each of the voice communications systems, even though each may operate with differing equipment and signal processing. The audio interface switches discrete voice communications signals and routes them to one of the left speaker, the right speaker, and conversely from the microphone of the headset to any of selected systems.

1 Claim, 5 Drawing Sheets

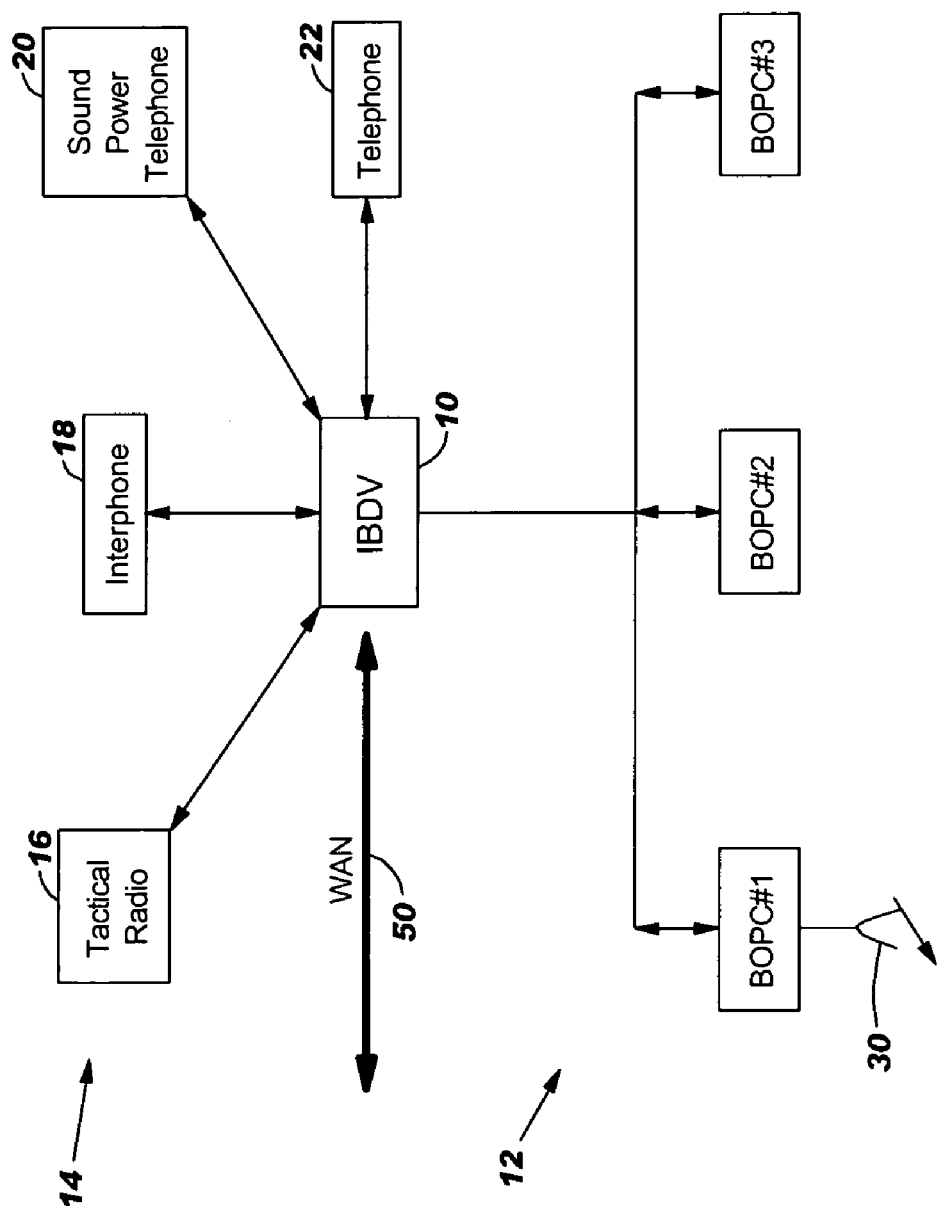

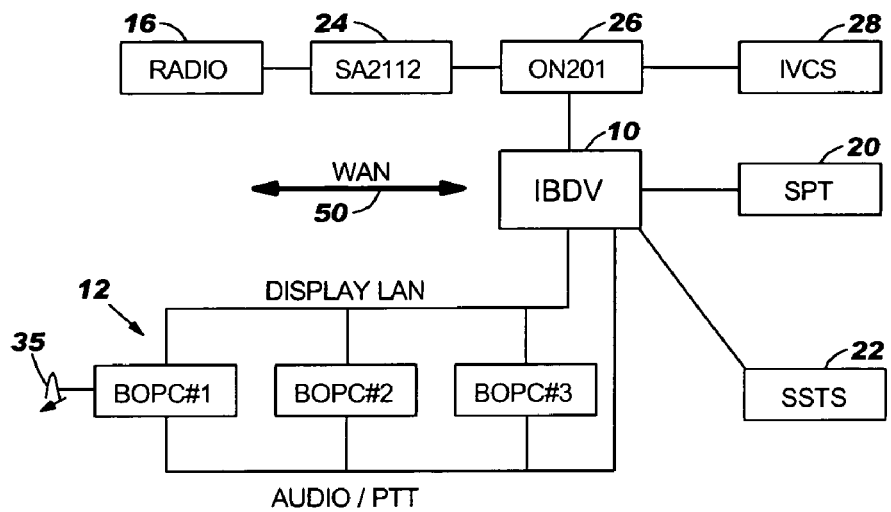
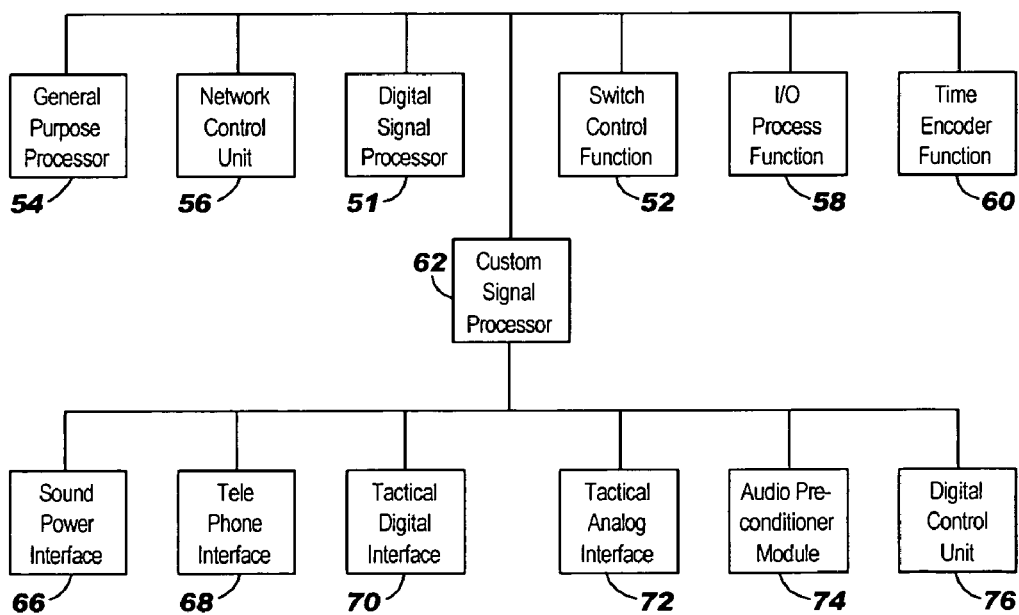

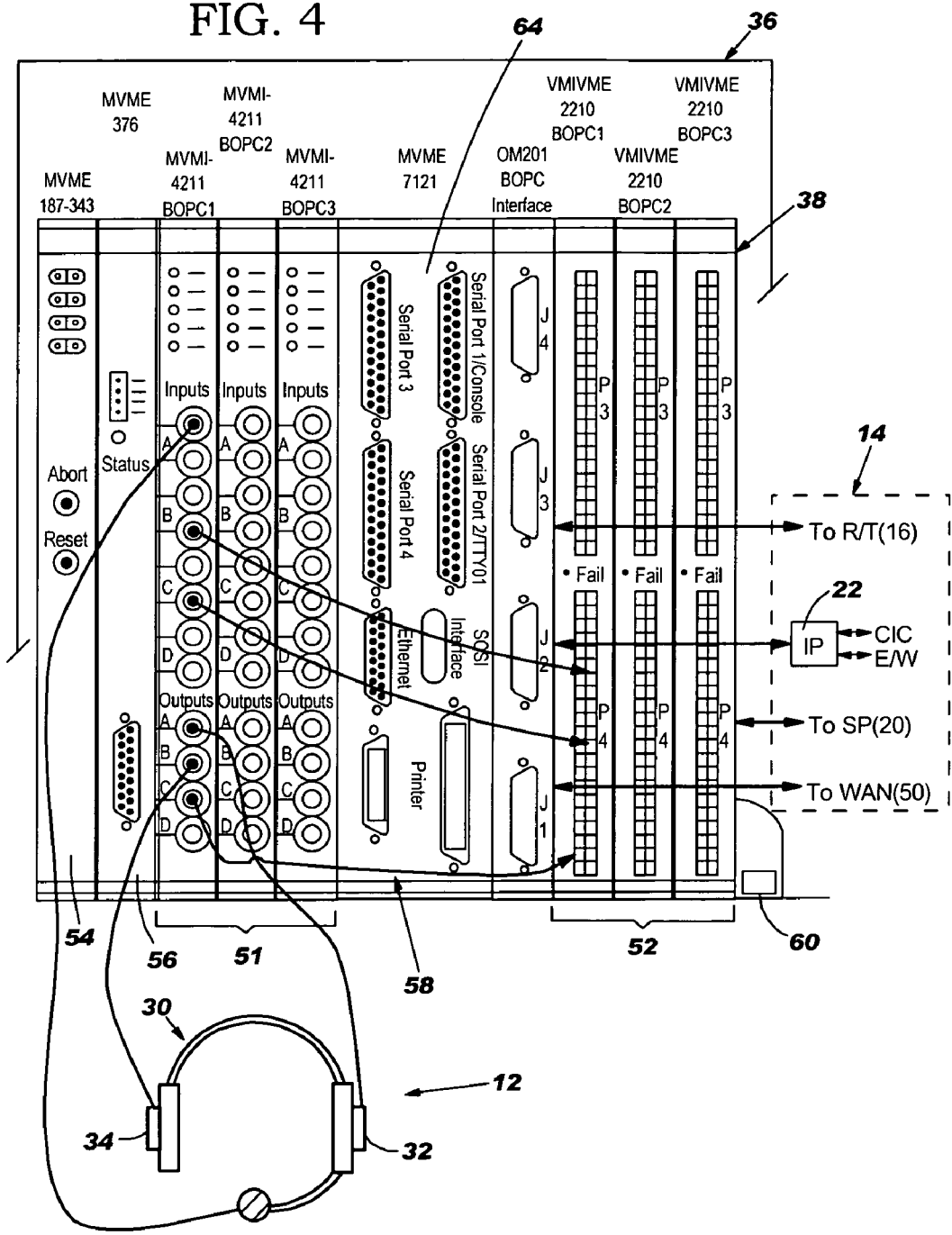

VOICE COMMUNICATIONS CONTROL SYSTEM AND METHOD

FIELD OF THE INVENTION

The present invention relates to communications signal control, and in particular to switching and routing of audio signals for enhancing training operations and communications between trainer and trainee.

BACKGROUND OF THE INVENTION

Distributed interactive simulation continues to grow in importance in military and civilian applications. Simulators are connected together over vast distances using a wide area network (WAN) interface. The Battle Force Tactical Trainer (BFTT) provides the U.S. Navy with onboard training for many different functions performed on a ship. While U.S. Navy ships are in port, the BFTT provides a communications connection between the ships participating in a tactical training exercise and selected scenario of interest, and connects these ships using Wide Area Network (WAN) technology. While these ships are connected together, they can participate with each other in team-training exercises. Using the BFTT, voice communications between ships within the tactical training scenario have been historically handled by a BFTT Digital Voice system (BDV) that sends and receives digital voice packets of data over the WAN. This type of communication is referred to as scenario control (SC) and is used for coordination of the training exercise by an operator. Typically, if the operator needs to communicate with someone onboard the ship that is not connected to the WAN, it is necessary to establish a separate communication link on an available and appropriate communication device.

The operator or operators controlling the training onboard each ship is generally referred to as a BFTT Operator Console operator, or BOPC operator. The BOPC operator has many tasks to perform when running a training exercise. By way of example, an Electronic Warfare (E/W) officer will typically be located in a room at a remote location compared to the training operator who is likely to be located in the Data Processing Control (DPC). The E/W officer or E/W staff member will typically communicate with the rest of the ship via an interphone (IP) circuit that generally includes headset and push-to-talk (PTT). The BOPC operator, typically wearing a headset that is compatible with the BOPC, removes the BOPC headset and switches to a headset and mic operated by the push-to-talk (PTT) mechanism. Further consider that the BOPC operator may need to simultaneously communicate with other members of the ship that have access to only a sound power (SP) phone circuit. To communicate with personnel positioned at these remote locations, the BOPC operator must again remove his BOPC headset, leave his position at the BOPC, and move to a location that has a sound power (SP) interface.

It is well known by those skilled in the art of tactical training, that time is of the essence during tactical training exercises. There is a particular need to improve the voice communication operations of the BOPC operator. There is a particular need to improve communications with those trainees that do not have access to the WAN during the training exercises.

SUMMARY OF THE INVENTION

In view of the foregoing background, it is therefore an object of the present invention to facilitate voice communications between an operator of a training console and trainees participating in a training exercise. It is further an object of the present invention to provide the BOPC operator coordinating the battle force training with improved communications with trainees positioned throughout the ship and participating in such exercises. The present invention provides a flexible and expandable architecture for enhancing voice communications, and in particular, for enhancing voice communications used onboard ships and at land sites during the BFTT exercises. The present invention is provided at a low cost when compared to typically available communications switching and routing systems. Further, the operator, an instructor in the BFTT exercises, now has effective access to a variety of communications devices using a single headset, which permits timely connection to the tactical communications systems onboard the ship. These communications systems include the interphone (IP) system used for intra-ship communications, tactical radio telephone system used for external ship communications, sound power used to access maintenance and tactical circuits onboard ship, as well as telephone interface capability for connections to commercial PBX exchanges and Wide Area Network scenario control communications.

These and other objects, advantages and features of the present invention are provided by an audio communications control system comprising a single headset having a left speaker, a right speaker, and a microphone for providing an operator with voice transmission. An audio interface operates between a plurality of audio communications equipment and the single headset. The audio interface provides an electrical connection to the plurality of voice communications systems for operation therewith, switching of discrete audio communications signals therefrom, and routing of the audio signals to one of the left speaker and the right speaker, and from the microphone of the headset. An operator control interface is operable with the audio interface for controlling the routing and switching of the audio signals, and includes a display for viewing by the operator and manual selection of the discrete audio communications signals to be operable with the single headset. In one preferred embodiment, the display comprises a graphical user interface display that is reconfigurable to a desired communications system display.

A method aspect of the present invention includes providing a single headset having a left speaker, a right speaker, and a microphone for providing an operator with voice transmission and electrically connecting an audio interface between a plurality of audio communications systems and the single headset. The audio interface switches discrete audio communications signals form the plurality of audio communications systems and routes them to one of the left speaker and the right speaker, and from the microphone of the headset in response to a command from an operator. A graphical user interface operable with the audio interface is provided for controlling the routing and switching of the audio signals by the operator. The operator activates a push button styled display for manual selection of discrete audio communications signals for operating with the headset. The method further includes the step of operating the graphical user interface for connection to a first discrete audio communications system and routing a first discrete audio signal to the left speaker and/or the right speaker of the single headset, as desired, for connection to a second discrete audio communications system, and routing a second discrete audio signal to another of the left speaker and/or the right speaker of the single headset. Also, connection is made for the microphone of the headset to a third discrete audio communications system, again as desired.

BRIEF DESCRIPTION OF THE DRAWINGS

A preferred embodiment of the invention, as well as alternate embodiments are described by way of example with reference to the accompanying drawings in which:

FIG. 1 is a block diagram illustrating one preferred embodiment of a voice communications control system interfacing with multiple communications systems onboard a ship;

FIG. 2 is a block diagram of one embodiment of the invention for interfacing with communications on a particular class of ship;

FIG. 4 is a partial plan view of one preferred embodiment of a hardware interface for the system of FIG. 3;

FIG. 5 is a block diagram illustrating a functional interface of elements of the interface of FIG. 4;

DETAILED DESCRIPTION OF PREFERRED EMBODIMENTS

Figure 3:
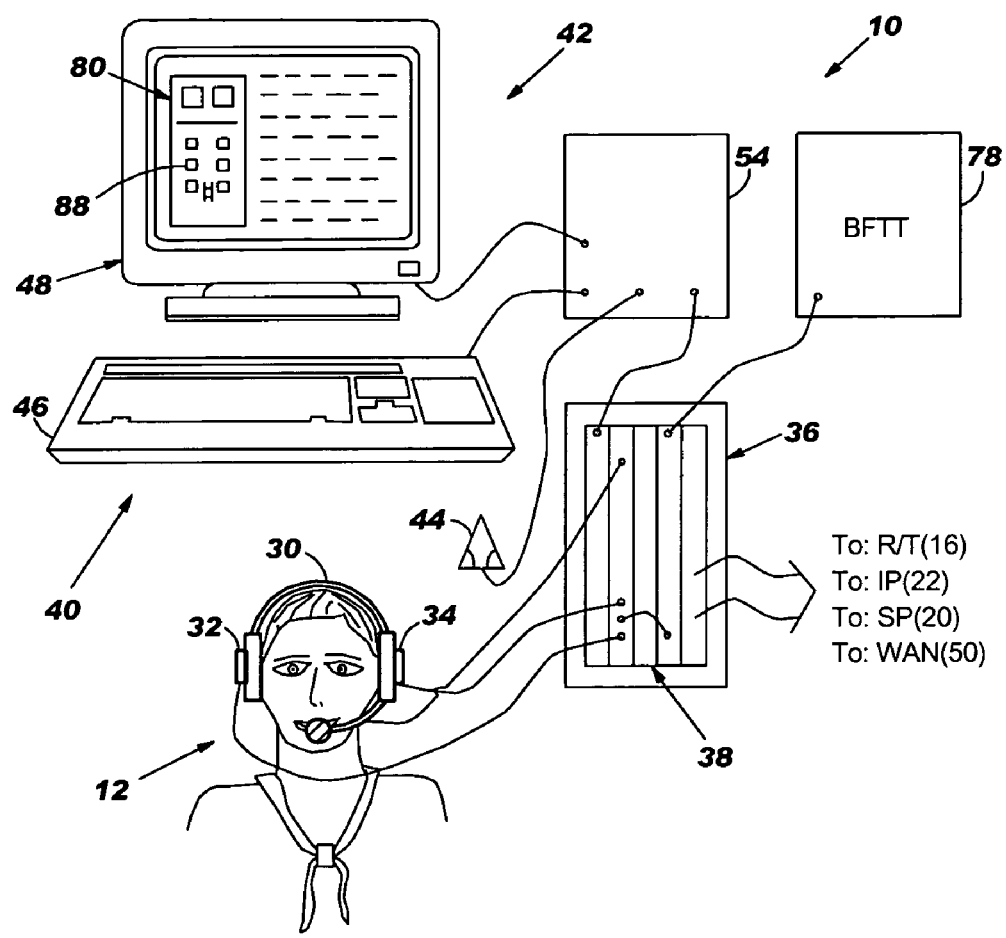
FIG. 3 is a diagrammatic block diagram illustrating one preferred embodiment of the system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numerals refer to like elements throughout.

As illustrated initially with reference to FIG. 1, one preferred embodiment of the present invention, a voice communications control system 10 includes both hardware and software for operationally connecting one or more BOPC operators 12 to tactical systems communications equipment 14 onboard a ship. Depending on the class of ship, tactical communications systems will include, by way of example, a tactical radio 16, an interphone 18, sound power telephone 20, the SC as earlier described, and a surface ship telephone 22. The surface ship telephone 22 will be used when the ship is docked and the surface ship telephone system (SSTS) is connected to typical private branch exchange (PBX) lines. By way of further example, access to the tactical radio 14 for an aircraft carrier class may be through a communications switch 24 and communications interface 26, as illustrated with reference to FIG. 2. In which case, one operator 12 would have signaling access to the radiotelephone 16 and internal voice communications systems (IVCS) 28, for the system 10 through the interface 26. The sound power telephones (SP) 20, and surface telephones 22 are accessed through a direct connection to these systems.

Further, and as illustrated with reference to FIGS. 1 and 2, and to FIG. 3, the operator 12 need wear only a single headset 30 to handle all operator communication needs, as will herein be described in further detail. The single headset 30 allows the operator to independently control the audio streams from various manually selected audio sources, to his left and right ears via left ear speaker 32 and right ear speaker 34 of the single headset 30. The system 10 includes a hardware interface 36 including electronic card modules 38 which accommodate electronic interfacing with the different ship communication systems 14 that may be present on a particular ship class, as illustrated by way of example, with reference to FIG. 4. The user interface 40 remains consistent across all ship platforms, and in one preferred embodiment, includes the single headset 30, personal computer (PC) 42 which uses a computer mouse 44 or typical alternate input devices such as a touch screen, a keyboard 46, and a monitor 48. The keyboard 46 will be typically be used by the operator 12 for tactical training data entry, and like the balance of the PC related hardware, is very familiar equipment for the operator. As a result, the system 10, not only acts as a communications integrator, but also has the ability to route audio from one tactical communications systems equipment 14 to either a wide area network (WAN) 50, or to another tactical system onboard ship. As illustrated with reference again to FIG. 4, the hardware interface 36 permits insertion of multiple operator modules, such as a digital signal processor (DSP) module 51 and switch control functions (SCF) 52. Common modules, such as the DSP module 51 and the SCF module 52 are scalable to operate with tactical interfaces for one or more operators 12. The hardware interface 36 scales by simply adding additional interface card modules 38 for each additional operator. The software will automatically scale to operate with the number of interface card modules seen on the computer bus. The system 10 accommodates modular upgrades by allowing a CPU module 54 and network interface cards to be upgraded without affecting the design or operation of the rest of the system. All audio information is digitized when it is routed to the DSP. Such a capability permits the system 10 to optionally save and time stamp the audio data for record and playback purposes, a valuable tool in training when reviewing performance for a scenario. Once the data is stored, training exercises that are visually reviewed can be enhanced by audio playback that is GPS time-stamped and synchronized to the events that took place during the exercise.

The functions of the modules 38 are further illustrated with reference to the block diagram of FIG. 5, and again to FIG. 4. The CPU module 54, earlier described, is a general-purpose processor performing typical commercial off-the-shelf (COTS) processor functions for general-purpose processing and input/output (I/O) control. A network control unit module 56 is a COTS interface for sending and receiving network packets of information across the Wide Area Network (WAN). The DSP module 51, a COTS interface, stores, converts, and compresses analog audio signals into a digital signal stream. The SCF module 52 controls the switching of audio data between the WAN 50 and the various tactical communications systems 14 onboard ship. An I/O process function module 58 controls the digital I/O interfaces to the tactical systems 14. A time encoder function module 60 provides a global positioning device (GPS) operation for "time stamping" of audio packets for record and playback purposes. By way of example, the system 10 records and plays back processed audio information and sends this information over the WAN or locally, via on board systems, as desired.

A custom signal processor module 62 provides the custom hardware interface 36 to the operational tactical equipment 14 onboard the ship through connection ports 64, as herein described by way of example. A sound power interface 66 processes the analog signals to and from the sound power telephones (SP) 20, earlier described with reference to FIGS. 1 and 2. A telephone interface 68 processes the analog signals to and from a standard telephone PBX interface, telephone 22. A tactical digital Interface 70 processes the digital messages to and from the operational equipment 14 onboard ship. A tactical analog interface 72 processes the analog audio data to and from the operational equipment 14 onboard the ship. An audio pre-conditioner module 74 adjusts the audio levels from the operational equipment 14 to levels acceptable by the digital signal processor module 51. A digital control unit 76 provides timing information for controlling the custom signal processor 62.

Figure 6:
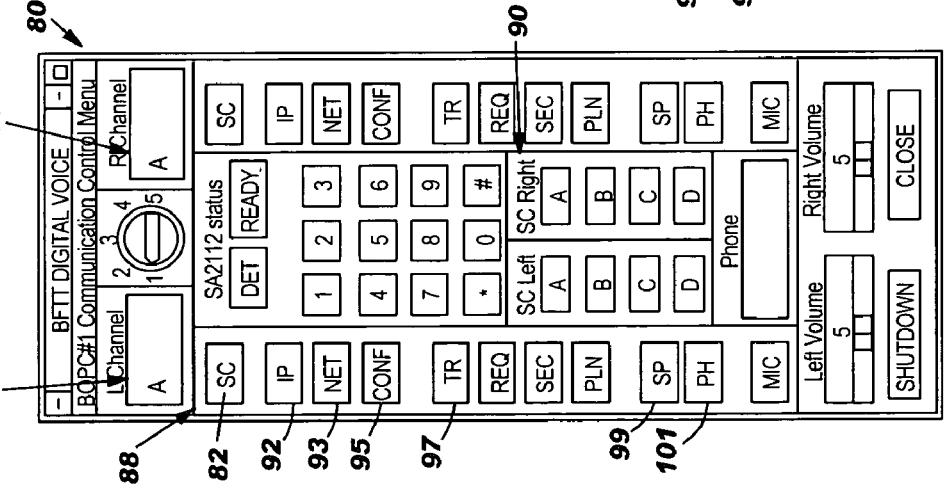
FIGS. 6, 7, and 8 are plan views of various presentations of a graphical user interface of the system of FIG. 1.

As illustrated with reference again to FIG. 3, and to FIG. 6, during operation of the system 10, the BOPC operator 12 establishes audio communications through the pressing of a voice button on a typical BFTT 78. In the preferred embodiment of the present invention, herein described by way of example, this BFTT voice button pressing action sends a signal to the system 10 which responds by presenting a graphical user interface (GUI) 80 to be presented on the monitor 48. The GUI 80 allows the operator 12 to configure and control all voice communications to and from his console. The system 10 permits the operator to communicate his voice to either the tactical communication equipment 14 onboard ship, or to the WAN 50 where the operator will typically communicate with other ships taking part in the training exercises.

In a preferred embodiment of the present invention, voice data sent and received over the WAN is called scenario control voice (SC) and activated by the SC button 82 in the GUI 80, as illustrated with reference again to FIG. 6. By way of further example, and as herein described, when operating in SC mode, the BOPC operator chooses among four different virtual frequencies labeled channel A, channel B, channel C, and channel D. Additional channels are included as required to meet scenario control requirements. Typically, the BOPC operators from several different ships are all connected to the same WAN and will thus hear SC voice when they are tuned to the same virtual frequency as the sender. Virtual frequency channel A is illustrated in left channel 84 and right channel 86 in the GUI 80 of FIG. 6, where the operator 12 has his left and right ear speakers 32, 34 tuned to send and receive voice data over the WAN on SC virtual frequency channels A. As described, voice data is also sent and received over the tactical communications equipment 14 onboard ship.

Ship communications equipment was described above and is further expanded to provide a brief explanation for the names selected for the GUI buttons 88, illustrated with reference against to FIG. 6. Communications established between two points on a ship is called interphone (IP) communication, thus an IP button 92. Communications established between three or more points on a ship is called conference (CONF) communications, thus a CONF button 93. Communications established on one of the ship's multiple voice networks is referred to as network (NET) communications, thus a NET button 95. Communications established on the ship's tactical radios that broadcast over the airways is called tactical radio (TR) communication, thus a TR button 97. Communication established over the sound powered circuits on a ship is called sound power (SP) communications, thus SP button 99. Communications established over the telephone circuits on a ship used to connect a ship in port to a commercial phone system is called telephone (PH) communications, thus a PH button 101. Button names may change without departing from the intent and teachings of the present invention. In addition, the GUI 80 is herein described as one preferred embodiment, but a hardwired structure including real buttons may be preferred depending on an environment in which the system 10 is to be used.

Figure 7:
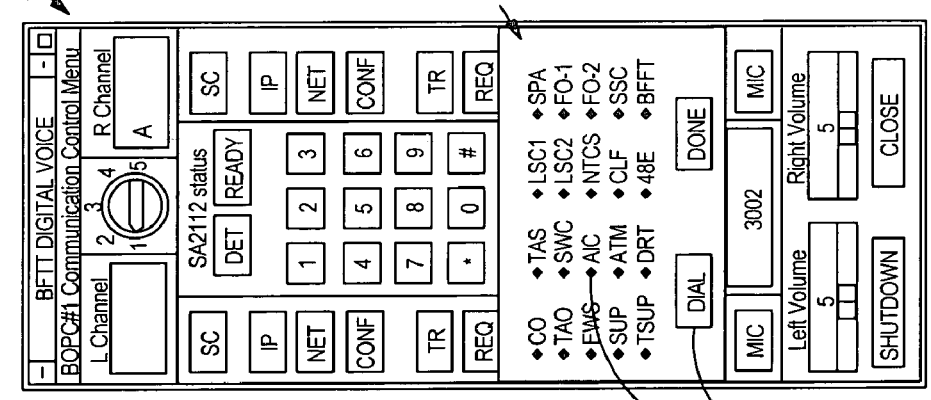
Figure 8:
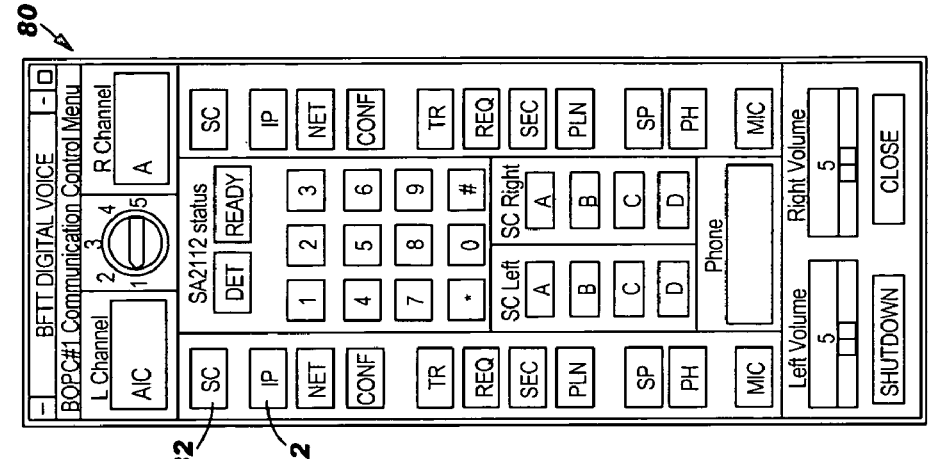

In operation, and with reference again to FIG. 6, by way of example, the BOPC operator 12 independently configures and controls the audio communication to his left and right ear, and can change his left or right ear to SC mode by depressing the SC button on the IBDV GUI. For the example herein described, consider the operator 12 having the headset 30 and connections as illustrated with reference again to FIG. 4. While in the SC mode, the BOPC operator 12 can choose between four virtual frequencies by depressing A, B, C, or D buttons 90 on the GUI 80. By way of further example, the operator 12 can change his lift or right ear to IP mode by depressing the IP button 92 on the GUI 80. Further, the system 10 provides a speed-dial menu 94, as illustrated with reference to FIG. 7, to assist the operator in selecting a desired person to call onboard the ship. The system 10 meets TEMPEST requirements for processing both secure and non-secure audio transmissions simultaneously. FIG. 7, by way of example, illustrates the GUI 80 for selecting access to the IP system 18 via the operator's left ear speaker 32. By way of further example, the speed-dial menu 94 appears and in this example, the operator selected the air intercept controller (AIC) by depressing the AIC button 96. AIC is indicated in the left channel 84 window of the GUI 80. The operator 12 would then press the DIAL button 98 and the connection is made to the AIC. In a preferred embodiment, activated buttons of the GUI 80 will be illuminated in varying colors, green for active, by way of example. Further, when the operator changed to an IP circuit, such as illustrated with reference to FIG. 8, the IP button 92 illuminates in green to indicate that IP is the selected communication mode, while the SC-Channel A button 82 will turn blue to indicate the SC circuit was on hold. As will now be appreciated, the operator 12 can change his left or right ear to NET, CONF, SP, or PH mode by following a similar procedure as herein described above.

In summary, the system 10 provides tactical and non-tactical communications systems onboard a typical U.S. Navy ship (by way of example, Conference, Tactical Radio, Sound Power, and Telephone) to be integrated for communications into a single headset. This enhances the effectiveness of onboard training by allowing the operator to handle all shipboard communications without removing his headset or moving from his console. Wide Area Network communications are also integrated into the same headset. The system not only acts as a communications integrator but also routes audio from one tactical system to either the wide area network, or to another tactical system onboard ship. The system is scalable to handle tactical interfaces for one or more operators as required by the different ship platforms. The hardware scales by simply adding additional interface cards of each additional operator. The software will automatically scale to handle the number of interface cards seen on the computer bus. The system can also accommodate modular upgrades by allowing the processor, DSP, and network interface cards to be upgraded without affecting the design or operation of the rest of the system. Further, since all audio information is digitized when it is routed to the DSP, the system can optionally save and time stamp the audio data for record and playback purposes. With the result that once training data is stored, training exercises that are visually reviewed can be enhanced by audio playback that is GPS time-stamped and synchronized to the events that took place during the exercise. The GUI allows the BOPC operator to configure and control the IBDV for setting up independent communications to the operator's left ear and right ear, as desired. Further, the GUI is re-configurable to handle the variances that typically appear when interfacing to communication equipment onboard different ship classes in the U.S. Navy.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principle scope of the invention to the full extent indicated by the broad general meaning of the terms in which the appended claims are expressed.

That which is claimed is:

1. A method of providing communications among a plurality of audio communications systems used onboard ships, the method comprising the steps of:
    providing a single headset having a left speaker, a right speaker, and a microphone for providing an operator with voice transmission;
    providing an audio hardware interface comprising:
        a central processing module for performing input/output control;
        a network control module for a Wide Area Network WAN;
        a digital signal processing module for storing, converting, and compressing analog audio signals into a digital signal stream;
        a switch control module for switching of audio signal between the WAN and the communications systems;
        an input/output process module for connecting the communications systems; and
        a time encoder module for performing a global positioning GPS time stamping of audio packets;
    connecting the audio hardware interface between the plurality of audio communications systems and the single headset for switching discrete audio communications signals from the plurality of audio communications systems and routing the discrete audio signals to one of the left speaker and the right speaker, and from the microphone of the headset in response to a command from an operator;
    providing an operator control interface comprising a push buttons styled display for viewing by the operator and manual selection of discrete audio communications signals for operating with the headset;
    providing a graphical user interface operable with the audio hardware interface for controlling the routing and switching of the audio signals, wherein the graphical user interface including scenario control buttons for selection of a desired virtual frequency channel of the WAN for inputs to one of the left speaker and the right speaker and for selection of the audio communication systems selected from a group comprising of a tactical radio telephone system, an interphone system, a sound power telephone system, and a surface ship telephone system;
    operating the graphical user interface for connection to a first audio communications system and routing a first discrete audio signal to one of the left speaker and the right speaker of the headset;
    operating the graphical user interface for connection to a second audio communications system and routing a second discrete audio signal to one another of the left speaker and the right speaker of the headset;
    operating the graphical user interface for connection of the microphone of the headset to a third audio communications system;
    selecting control buttons of the graphical user interface for communications between the headset and the WAN wherein the communications includes sending and receiving network packets of information across the WAN; and
    time encoding of a recording of voice communications using the global positioning system for time stamping of audio packets transmitted and received via WAN.

* * * * *